United States Patent [19]

Kimura

[11] Patent Number: 5,257,314
[45] Date of Patent: * Oct. 26, 1993

[54] VOICE RECOGNITION SYSTEM HAVING WORD FREQUENCY AND INTERMEDIATE RESULT DISPLAY FEATURES

[75] Inventor: Shinta Kimura, Kanagawa, Japan

[73] Assignee: Fujitsu Limited, Kawasaki, Japan

[ * ] Notice: The portion of the term of this patent subsequent to Oct. 9, 2007 has been disclaimed.

[21] Appl. No.: 622,598

[22] Filed: Dec. 5, 1990

[30] Foreign Application Priority Data

Dec. 6, 1989 [JP] Japan .................................. 1-316991

[51] Int. Cl.$^5$ .................................. G10L 5/06
[52] U.S. Cl. .................................. 381/43; 381/41
[58] Field of Search .................................. 381/41–43, 381/48

[56] References Cited

U.S. PATENT DOCUMENTS

| | | | |
|---|---|---|---|
| 4,590,605 | 5/1986 | Hataoka et al. | 381/43 |
| 4,672,608 | 6/1987 | Kitazume | 381/43 |
| 4,783,802 | 11/1988 | Takebayashi | 381/43 |
| 4,783,803 | 11/1988 | Baker et al. | 381/42 |
| 4,881,266 | 11/1989 | Nitta et al. | 381/43 |
| 4,962,535 | 10/1990 | Kimura et al. | 381/43 |
| 4,975,959 | 12/1990 | Benbassat | 381/43 |
| 5,058,167 | 10/1991 | Kimura et al. | 381/43 |

FOREIGN PATENT DOCUMENTS

| | | |
|---|---|---|
| 0302614A1 | 7/1988 | European Pat. Off. . |
| 3819178A1 | 6/1988 | Fed. Rep. of Germany . |
| 2194661A | 4/1986 | United Kingdom . |

OTHER PUBLICATIONS

An Algorithm for Determining the Endpoints of Isolated Utterances: by L. R. Rabiner and M. R. Sambur.

*Primary Examiner*—Dale M. Shaw
*Assistant Examiner*—Kee M. Tung
*Attorney, Agent, or Firm*—Staas & Halsey

[57] ABSTRACT

A voice recognition system includes a microphone for converting a voice to an electrical voice signal including voice and non-voice sound portions. An acoustic processing unit detects power and spectrum of the electrical voice signal, and outputs power time-series data and spectrum time series data. A voice section detection unit uses the power time-series data to detect a start point and an end point of the voice sound portion, and outputs an end decision signal indicative of such end point. A word dictionary stores word labels ordered in accordance with frequency of use, as well as word numbers and word templates. A recognition unit receives the feature time-series data and calculates a degree of similarity between the voice and the word templates. A sorting unit sorts data calculated in the recognition unit in accordance with the degree of similarity. A selection unit selects one or more words having a higher degree of similarity from words sorted in the sorting unit, and outputs these words to a display unit. A word frequency dictionary stores word labels, word numbers, word templates, and frequency data attached to each word label. Finally, a word dictionary sorting unit coupled between the word dictionary and the word frequency dictionary, sorts the word label of the word frequency dictionary in accordance with the order of higher frequency, and outputs sorted words to the word dictionary.

10 Claims, 14 Drawing Sheets

Fig. 4
PRIOR ART

| WORD NUMBER | WORD LABEL | WORD TEMPLATE (FEATURE TIME-SERIES DATA) |
|---|---|---|
| 1 | Aichi | |
| 2 | Aomori | |
| 3 | Akita | |
| 4 | | |
| ... | ... | |
| 25 | Osaka | |
| ... | | |
| 70 | Tokyo | |

Fig. 9

| FREQUENCY | WORD NUMBER | WORD LABEL | WORD TEMPLATE (FEATURE TIME-SERIES DATA) |
|---|---|---|---|
| 50 | 1 | Aichi | |
| 10 | 2 | Aomori | |
| 9 | 3 | Akita | |
| | 4 | | |
| 80 | 25 | Osaka | |
| 100 | 70 | Tokyo | |

Fig. 10

| FREQUENCY | WORD NUMBER | WORD LABEL | WORD TEMPLATE (FEATURE TIME-SERIES DATA) |
|---|---|---|---|
| 100 | 70 | Tokyo | |
| 80 | 25 | Osaka | |
| | | | |
| 50 | 1 | Aichi | |
| 10 | 2 | Aomoi | |
| 9 | 3 | Akita | |

Fig. 11

| WORD NUMBER | WORD LABEL | WORD TEMPLATE (FEATURE TIME-SERIES DATA) |
|---|---|---|
| 70 | Tokyo | |
| 25 | Osaka | |
| | | |
| 1 | Aichi | |
| 2 | Aomori | |
| 3 | Akita | |

VOICE RECOGNITION SYSTEM HAVING WORD FREQUENCY AND INTERMEDIATE RESULT DISPLAY FEATURES

BACKGROUND OF THE INVENTION

1. Field of the Invention

The present invention relates to a voice recognition system which can immediately recognize and analyze a voice input by an operator.

2. Description of the Related Art

Recently, voice recognition systems have been widely utilized in the field of factory automation for automatically classifying various articles. In factory automation, when an operator reads the name of an article and the destination thereof, the voice recognition system recognizes the voice, and the article is classified in accordance with a destination, on a belt conveyor. Further, the name, price, destination, and the like, of the article are automatically printed on a tag based on the above recognition.

In general, the conventional voice recognition system has at least one word dictionary in storage means which stores various words. Briefly, when the voice of the operator is input into the voice recognition system, a word corresponding to the voice is sequentially searched for in the word dictionary. When a word corresponding to the voice is found, or hit, in the word dictionary, the word is displayed on a CRT and printed on the tag.

In this case, it is necessary to store as many words as possible in the word dictionary to insure an accurate hit. However, there is a limitation of the capacity (number of words, or vocabulary to be stored) in the word dictionary due to structural limitations of the storage means. Also, the larger the capacity becomes, the longer the time necessary to search for the corresponding word becomes.

SUMMARY OF THE INVENTION

The object of the present invention is to provide a voice recognition system enabling high speed search for a corresponding word.

In the present invention, there is provided a voice recognition system including the following. A microphone is provided for converting a voice to an electrical voice signal having a voice sound portion and a non-voice portion. An acoustic processing unit detects a power and spectrum of the electrical voice signal in accordance with a predetermined sampling time interval, and outputs power time-series data and spectrum time-series data at the predetermined sampling time interval, and these are referred to hereinafter as a feature time-series data. A voice section detection unit receives the power time-series data from the acoustic processing unit, detects a start point and an end point of the voice sound portion, and outputs an end decision signal when the end of the voice sound portion is decided. A word dictionary is provided for storing word labels, word numbers corresponding to the word labels, and word templates constituted by the feature time-series data corresponding to the word labels, the word labels being ordered in accordance with frequency of use of the words. A recognition unit receives the feature time-series data of the voice to be verified, verifies or compares the feature time-series data with the word template stored in the word dictionary, and calculates a degree of similarity between the voice and the word template. A sorting unit is provided for sorting data calculated in the recognition unit in accordance with the degree of similarity, the data being sorted in order of the highest degree of similarity. A selection unit selects one or more words having a higher degree of similarity from words sorted in the sorting unit, and outputs these words to a display unit. A word frequency dictionary is provided in addition to the word dictionary, for storing word labels, word numbers corresponding to each word label, word templates constituted by the feature time-series data corresponding to each word label, and frequency data attached to each word label. Finally, a word dictionary sorting unit is provided between the word dictionary and the word frequency dictionary, for sorting the word labels of the frequency word dictionary in order of the higher degree of frequency, and outputting sorted words to the word dictionary.

BRIEF DESCRIPTION OF THE DRAWINGS

In the drawings:

FIG. 4 is a view for explaining the content of a word dictionary in a conventional art;

FIG. 9 is a view for explaining the content of a frequency word dictionary according to the present invention;

FIG. 10 is a view for explaining an output of the word dictionary sorting unit according to the present invention;

FIG. 11 is a view for explaining the content of a word dictionary according to the present invention;

DESCRIPTION OF THE PREFERRED EMBODIMENTS

Before describing the preferred embodiments, an explanation will be given of a conventional voice recognition system.

Figure 1:
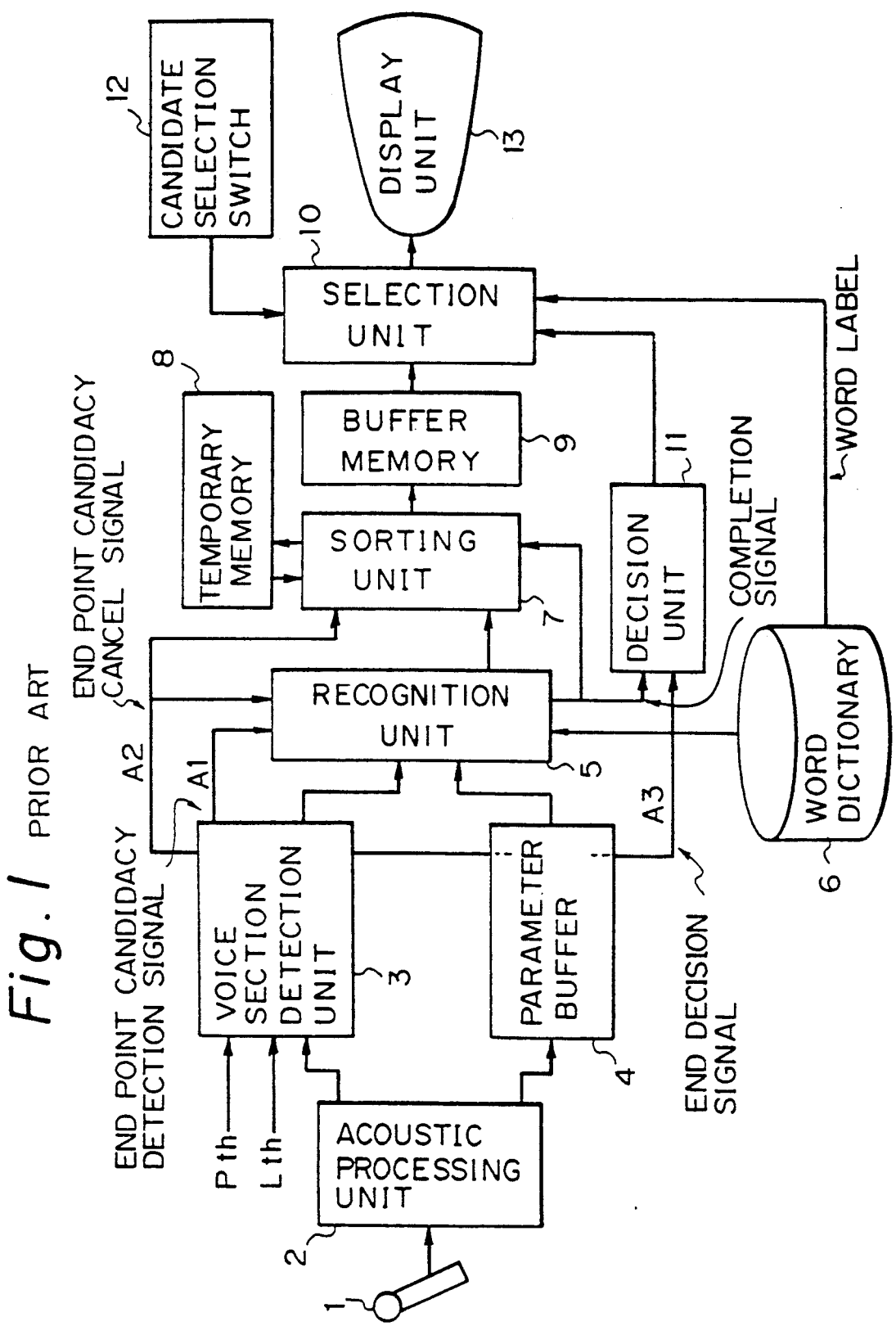
FIG. 1 is a schematic block diagram of a conventional voice recognition system.

FIG. 1 is a schematic block diagram of a conventional voice recognition system. In FIG. 1, reference number 1 denotes a microphone, 2 an acoustic processing unit, 3 a voice section detection unit, 4 a parameter buffer, 5 a recognition unit, 6 a word dictionary, 7 a sorting unit, 8 a temporary memory, 9 a buffer memory for storing a resultant data, 10 a selection unit, 11 a decision unit, 12 a selection switch, and CRT 13.

The microphone 1 converts a voice (speech input) into an electrical voice signal. In general, the voice is constituted by a voice sound portion and a non-voice sound portion.

The acoustic processing unit 2 detects a power (energy of a voice) and a spectrum of the electrical voice signal in accordance with a sampling time interval from several miliseconds to several tens of miliseconds. The acoustic processing unit 2 converts the electrical voice signal to feature time-series data to be stored in a word dictionary as a template. There are several known methods of spectrum analysis in the conventional art. For example, a method using an analog filter bank, a method using a digital filter bank, and a method using FFT (Fast Fourier Transformation). The acoustic processing unit 2 outputs power time-series data (upper side arrow) and spectrum time-series data (lower side arrow).

The voice section detection unit 3 receives the power time-series data from the acoustic processing unit 2, and a power threshold level Pth and a time threshold level Lth from an external unit (not shown). The voice section detection unit 3 detects a start point and an end point of the voice sound. However, since the end point of the voice sound cannot be decided in a first step, a "candidate end point" is established, and the voice section detection unit 3 detects the actual end point called "end point decision" in a final step.

The parameter buffer 4 temporarily stores the spectrum time-series data from the acoustic processing unit 2.

The recognition unit 5 receives the start point and the candidate end point of the voice sound from the voice section detection unit 3. It also receives the voice sound portion of the spectrum time-series data from the parameter buffer 4. Further, the recognition unit 5 calculates a degree of similarity (or distance, or probability) between the spectrum time-series data of the voice and the word template stored in the word dictionary 6. In general, the degree of similarity (or distance, or probability) is sequentially calculated for every word template using a DP matching method. Accordingly, the recognition operation is started by the detection of the candidate end point, and stopped by the cancellation of the candidate end point. A1 denotes an end point candidacy detection signal, A2 an end candidacy cancel signal, and A3 an end decision signal.

The word dictionary 6 stores word numbers, word labels, and word templates (feature time-series data) as shown in FIG. 4.

The sorting unit 7 receives the word number and the degree of similarity from the recognition unit 5, and the words are sorted in accordance with the degree of similarity. That is, a word having a larger degree of similarity is ranked at the upper end portion of a similarity table. The order of the degree of similarity is stored in the temporary memory 8.

The buffer memory 9 stores the resultant sort data after recognition.

The selection unit 10 receives a word label corresponding to the word number of the upper word candidate (for example, one of the words ranked from first to twentieth) in the word dictionary 6, and transfers this word to the display unit 13. The selection unit 10 also receives the word label corresponding to the word number of the next word candidate (for example, one of the words ranked from twentieth to fortieth) in the word dictionary 6, and transfers this word to the display 13.

The decision unit 11 calculates an AND logic between a recognition completion signal and an end decision signal, and sends the resultant data to the selection unit 10.

The candidate selection switch 12 is used by the operator. The operator pushes this switch 12 to request the display of another word candidate when the corresponding word is not contained on the display 13.

Figure 2:
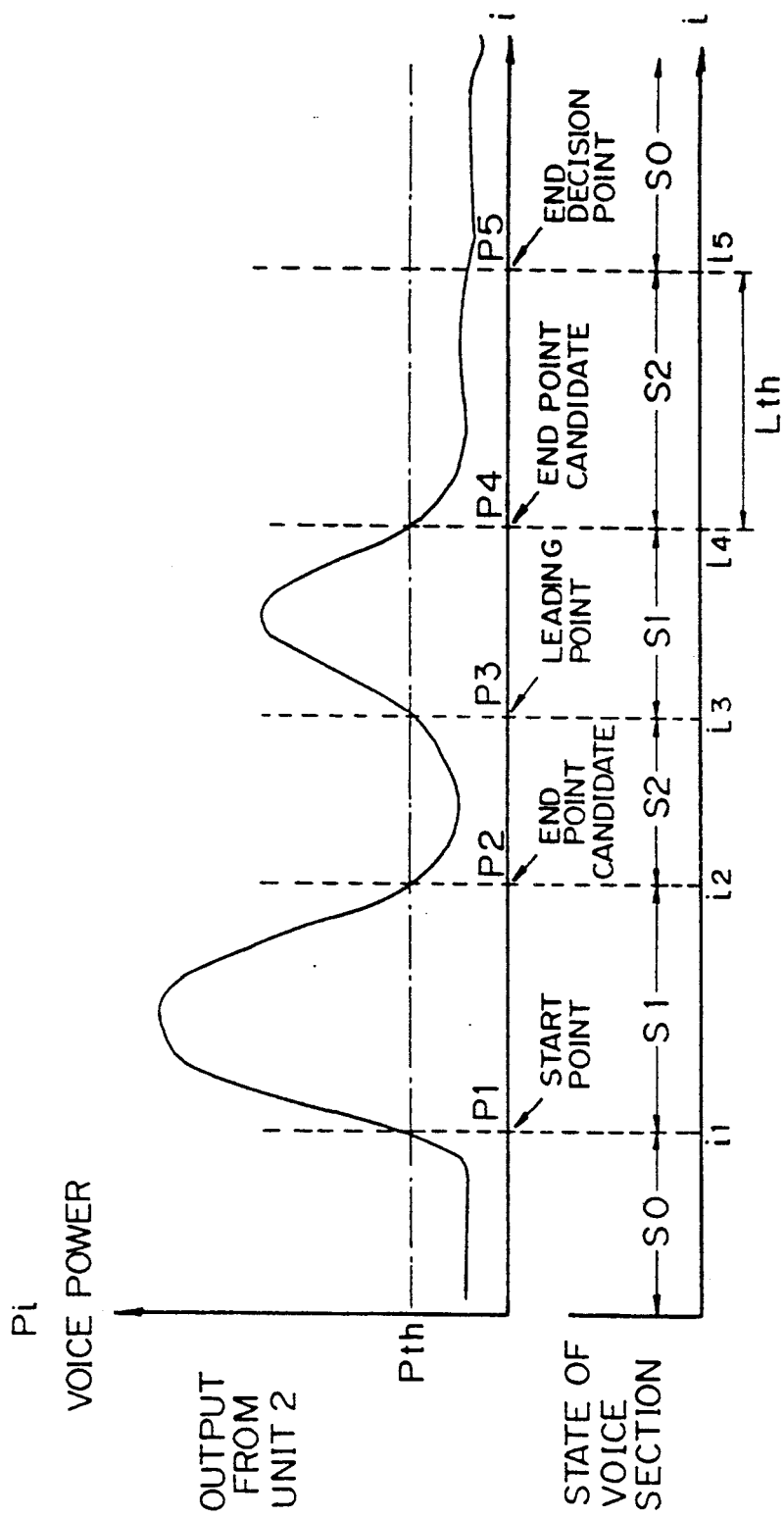
FIG. 2 is a graph for explaining a voice sound and non-voice sound.

FIG. 2 is a graph for explaining voice sound and non-voice sound. The ordinate Pi denotes voice power and the abscissa "i" denotes time. The symbol Pth denotes the threshold power of the voice, and the symbol Lth denotes the time threshold level of the non-voice sound. Further, P1 denotes the start point of the voice sound, P2 and P4 denote the end point candidates of the voice sound, P3 denotes a leading point, and P5 denotes end decision point. Further, S0 denotes the state of the non-voice sound, S1 denotes the state of the voice sound, and S2 denotes the state of the end decision. Still further, i1 to i5 denote boundary lines of each state. A voice over the power threshold level Pth is called a voice sound, and a voice under the power threshold level Pth is called a non-voice sound.

Figure 3:
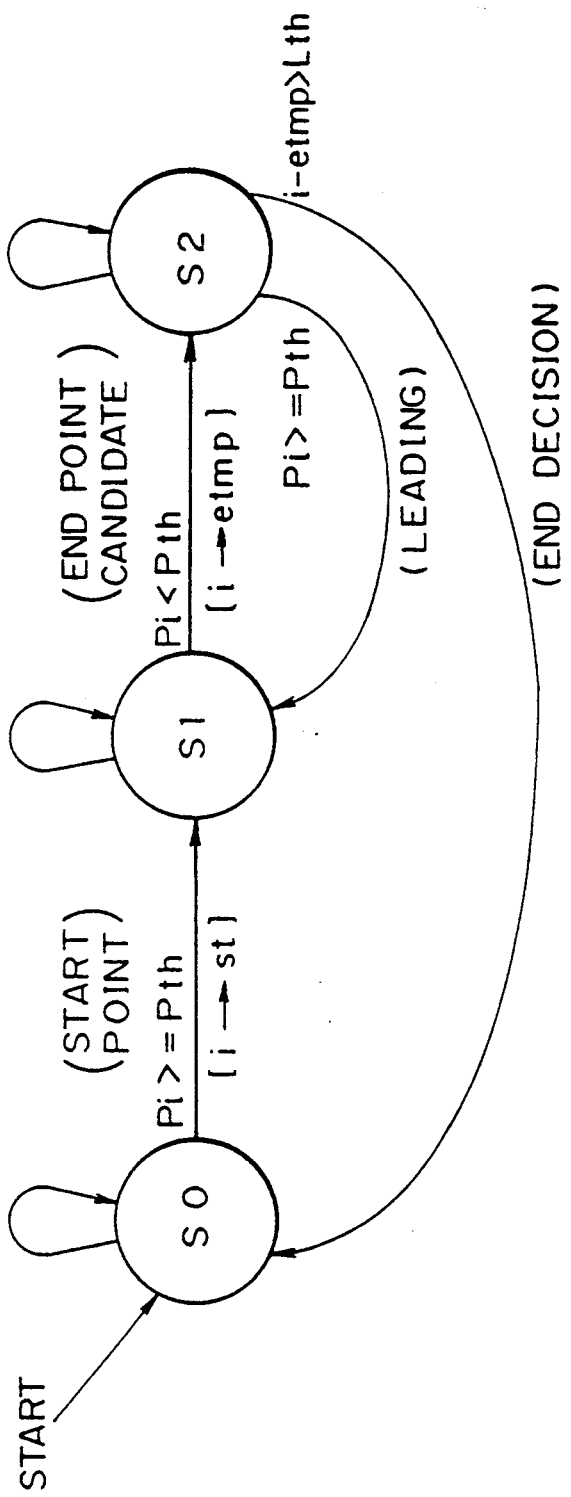
FIG. 3 is a view for explaining voice processing steps in a voice section detection unit.

FIG. 3 is a view for explaining the voice processing steps in the voice section detection unit 3. As shown in the drawing, the voice section detection unit 3 has three states: the non-voice sound state S0, the voice sound state S1, and the end decision state S2.

In the non-voice state S0, the voice power Pi is checked to determine whether or not it exceeds the threshold level Pth. When the voice power Pi exceeds the threshold level Pth, the state S0 shifts to the voice state S1. The start point P1 corresponds to the start of the state S1. The value of the start point P1 is held in a register "st" (not shown).

In the voice state S1, the voice power Pi is checked to determine whether or not it is lower than the threshold level Pth. When the voice power Pi is lower than the threshold level Pth, the state S1 shifts to the end decision state S2. The candidate end point P2 corresponds to the end of the state S1. The value of the candidate end point P2 is held in a register "etmp" (not shown).

In the end decision state S2, two checks are performed. One check is to determine whether or not the voice power Pi exceeds the threshold level Pth, and the other check is to determine whether or not the difference between time (i) and the time held in the register "etmp" exceeds the time threshold Lth (for example, 0.3 sec).

In the first check, the state is changed from the end decision state S2 to the voice state S1 at the timing when the voice power Pi exceeds the threshold level Pth. In the second check, the state is changed from the end decision state S2 to the state S0 at the timing when the difference between time (i) and the time held in the register "etmp" exceeds the time threshold Lth. This timing (the point P5) corresponds to the end decision point.

The voice section detection unit 3 outputs the end point candidacy detection signal A1 to the recognition unit 5 when the state is changed from the state S1 to the state S2. Further, the voice section detection unit 3 outputs the end point candidacy cancel signal A2 to the recognition unit 5 when the state is changed from the state S2 to the state S1, and outputs the end decision signal A3 to the decision unit 11 when the state is changed from the state S2 to the state S0.

FIG. 4 is a view for explaining the content of a word dictionary in the conventional art. The word labels (for example, Aichi, Aomori, Akita,—, Osaka,—, Tokyo) are arranged in alphabetical order. A word number 1, 2,— is attached to each word label. Further, the feature time-series data (word template) is provided to the corresponding word label. In this case, the number of words correspond to the vocabulary stored in the word dictionary 6.

Figure 5:
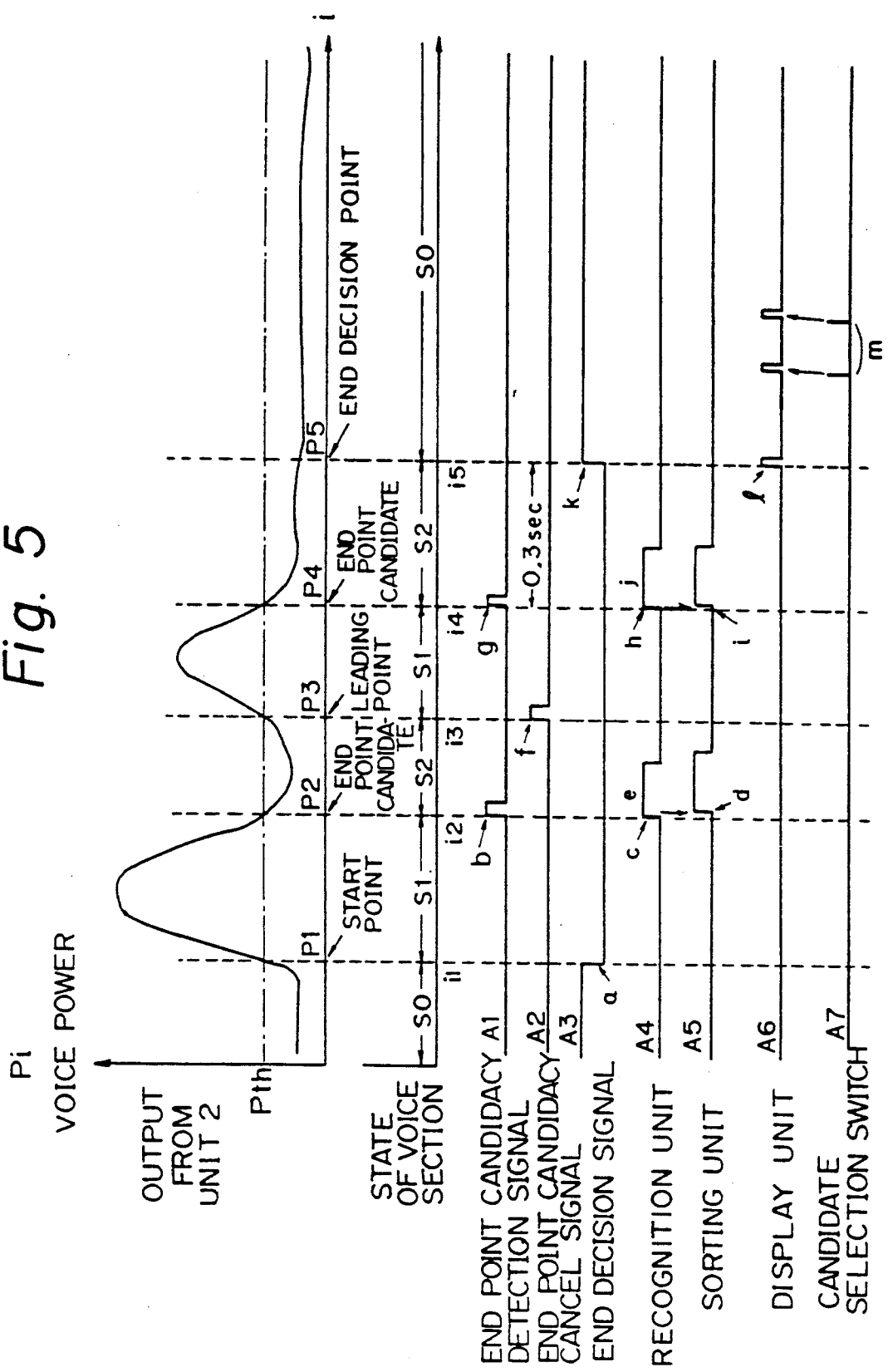
FIG. 5 is a signal timing chart for each of the signals in the case of a small vocabulary.

FIG. 5 is a signal timing chart for each of the signals for a case when a small vocabulary is stored in the word dictionary. In FIG. 5, A1 denotes the end point candidacy detection signal, A2 denotes the end point candidacy cancel signal, A3 denotes the end decision signal, A4 denotes the recognition signal, A5 denotes the sorting signal, A6 denotes a display signal, and A7 denotes a candidacy selection switch signal.

When the start point P1 of the voice section is detected in the voice section detection unit 3, the end decision signal A3 of the immediately preceding voice is cleared (a).

Next, when the end point candidate P2 is detected in the unit 3, the end point candidacy detection signal A1 is generated from the voice section detection unit 3 and sent to the recognition unit 5 (b). Further, the recognition operation is started in the recognition unit 5 (c), and the sorting unit 7 is activated (d). In this example, since the number of words stored in the word dictionary is very few (small vocabulary), the recognition time for the corresponding word is also very short (e).

Next, when a voice sound is again detected in the voice section detection unit 3, the end point candidacy cancel signal A2 is generated from the voice section detection unit 3 (f). When the end point candidacy detection signal A1 is again generated (g), the recognition operation is again started (h), and the recognition operation is again started (h), and the sorting unit 7 is again activated (i). The recognition operation is stopped after a short time (j).

After a lapse of, for example, 0.3 seconds from the detection of the second end point candidate (P4), the end decision signal A3 is generated from the voice section detection unit 3 (k), and the result of the recognition is automatically displayed on the CRT (1). When this result of the recognition is incorrect, the next word candidate is displayed on the CRT by using the candidate selection switch (m) which is operated by the operator.

Figure 6:
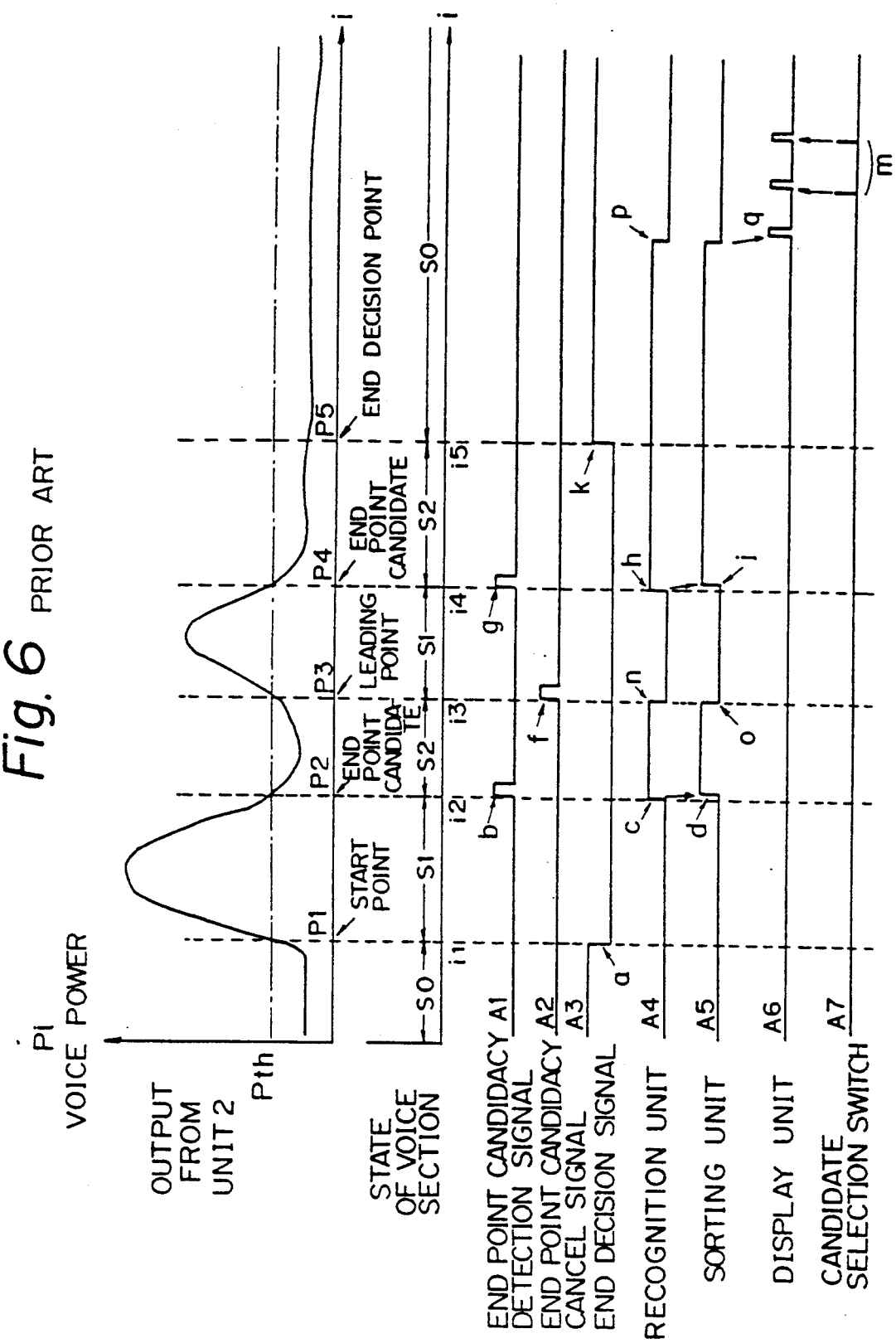
FIG. 6 is a signal timing chart for each of the signals in the case of a large vocabulary in a conventional art.

FIG. 6 is a signal timing chart for each of the signals in the case of a large vocabulary. Unlike the case of the small vocabulary in FIG. 5, there are some problems in the case of the large vocabulary as explained below.

In FIG. 6, the steps from (a) to (d) are the same as those of FIG. 5. When the end point candidacy cancel signal A2 is generated from the voice section detection unit 3 (f), although the recognition operation is in progress because the words to be compared are large, the recognition operation is temporarily stopped (n), and the sorting operation is also stopped (o), after which, the recognition operation is again started (h), and the sorting unit 7 is again activated (i).

After a lapse of 0.3 seconds from the detection of the second end point candidate point (P4), the end decision signal A3 is generated from the voice section detection unit 3 (k). However, since the recognition operation is in progress (h), the result of the recognition is not displayed on the CRT until after the recognition operation is completed (P).

The result of the recognition is then automatically displayed on the CRT (1), and when this result of the recognition is incorrect, a next word candidate is displayed on the CRT by using the candidate selection switch (m).

As explained above, with the large vocabulary, a long time is necessary from the generation of the end decision signal (k) until the display of the result of the recognition (i) because a longer time is needed for searching for the corresponding word in the word dictionary. Accordingly, the recognition speed becomes slow so that the throughput of the voice recognition system also becomes slow.

Figure 7:
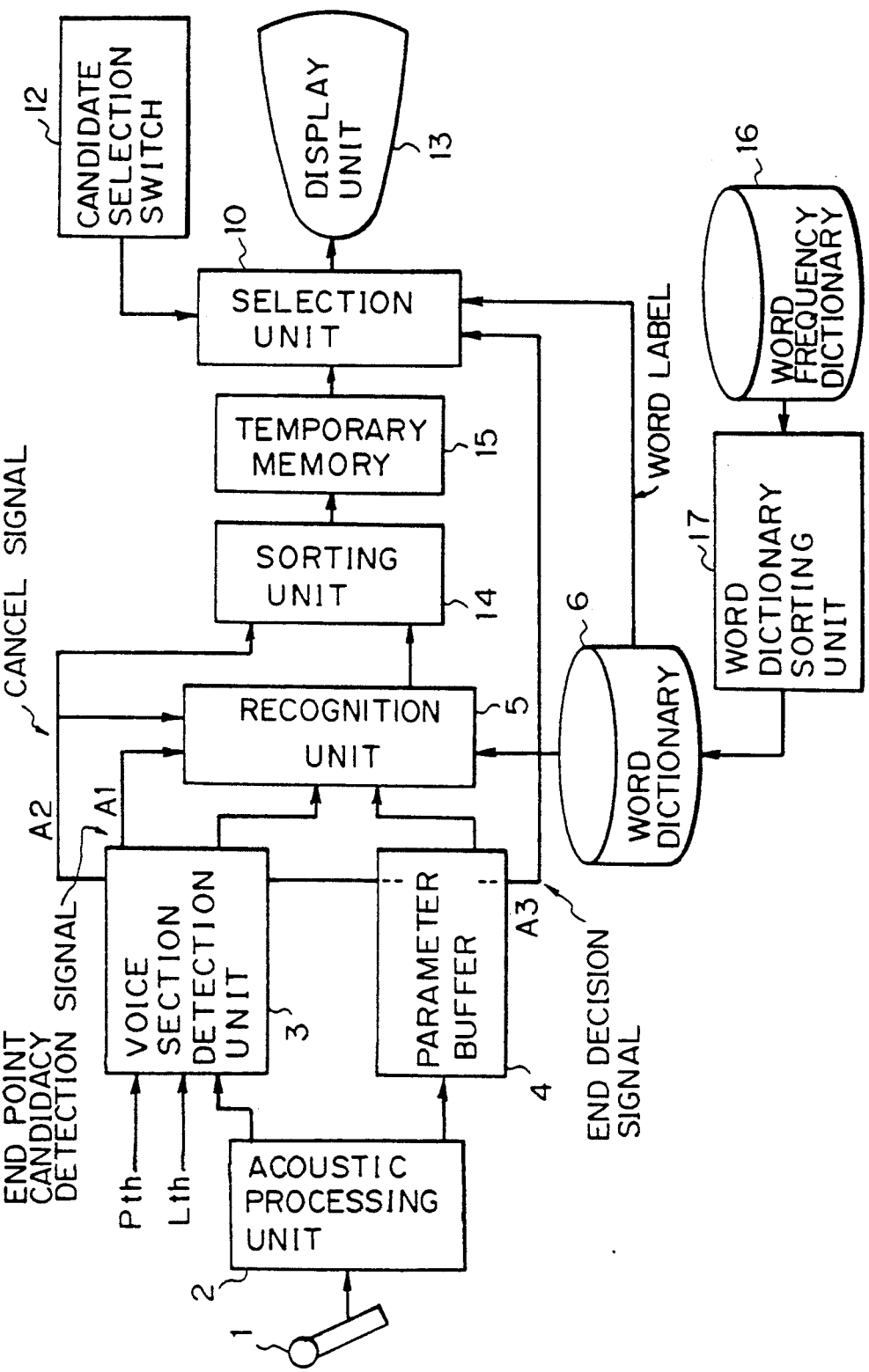
FIG. 7 is a schematic block diagram of a voice recognition system according to the present invention.

FIG. 7 is a schematic block diagram of a voice recognition system according to the present invention. As shown in FIG. 7, the temporary memory 8 and the decision unit 11 shown in FIG. 1 are deleted, and the buffer memory 9 in FIG. 1 is replaced with a temporary memory 15. The sorting unit 7 of FIG. 1 is replaced with a new sorting unit 14. Further, a second word dictionary 16 is provided for storing words in accordance with their frequency of use (below, a word frequency dictionary). Still further, a word dictionary sorting unit 17 is also provided between the word dictionary 6 and the word frequency dictionary 16.

In FIG. 7, each component has the following function.

The microphone 1 converts the voice (speech input) to an electrical voice signal constituted by the voice sound portion and the non-voice sound portion.

The acoustic processing unit 2 detects the power and spectrum of the electrical voice signal in accordance with the sampling time interval from several milliseconds to several tens of milliseconds. Further, the acoustic processing unit 2 converts the electrical voice signal to feature time-series data. The two outputs of the acoustic processing unit 2 denote power time-series data and spectrum time-series data.

The voice section detection unit 3 receives the power time-series data from the acoustic processing unit 2. It also receives the power threshold level Pth and the time threshold level Lth. The voice section detection unit 3 detects the start point and the end point of the voice sound, and finally the end decision point.

The parameter buffer 4 temporarily stores the spectrum time-series data from the acoustic processing unit 2.

The recognition unit 5 receives the start point and the end point candidate of the voice sound from the voice section detection unit 3. It also receives the voice sound portion of the spectrum time-series data from the parameter buffer 4, and calculates the degree of similarity (or distance, or probability) between the spectrum time-series data and the word stored in the word dictionary 6. In general, the degree of similarity (or distance, or probability) is sequentially calculated for every word template by mainly using the DP matching method, and the resultant data is output to the sorting unit 14. Accordingly, the recognition operation is started by the detection of the end point candidate, and stopped by the cancellation of the end point candidate.

The word dictionary 6 stores word numbers, word labels, and word templates (feature time-series data) as shown in FIG. 11. In the present invention, the words are ordered in accordance with the frequency of use of each word as explained hereafter.

The sorting unit 14 receives the word number and the degree of similarity from the recognition unit 5, and the words are sorted in accordance with the degree of similarity. That is, words having a larger degree of similarity are ranked at the upper end portion of the degree of similarity table.

The temporary memory 15 stores the resultant data of the sort after recognition.

The selection unit 10 receives the word read label corresponding to the word number of the upper word candidate from the word dictionary 6, and transfers this word to the display unit 13 when the end decision signal is detected from the voice section detection unit 3. Further, the selection unit 10 reads the word label corresponding to the word number of the next word candidate from the word dictionary 6, and transfers this word to the display unit 13 when the candidate selection switch is pushed.

The candidate selection switch 12 is used by the operator. The operator pushes this switch 12 to request the display of another word candidate when the corresponding word is not contained on the display 13 after recognition.

The word frequency dictionary 16 stores words along with their frequency of use as shown in FIG. 9.

The word dictionary sorting unit 17 is provided between the word dictionary 6 and the word frequency dictionary 16, and words are sorted in order of the frequency of use of the words as shown in FIG. 10.

Figure 8:
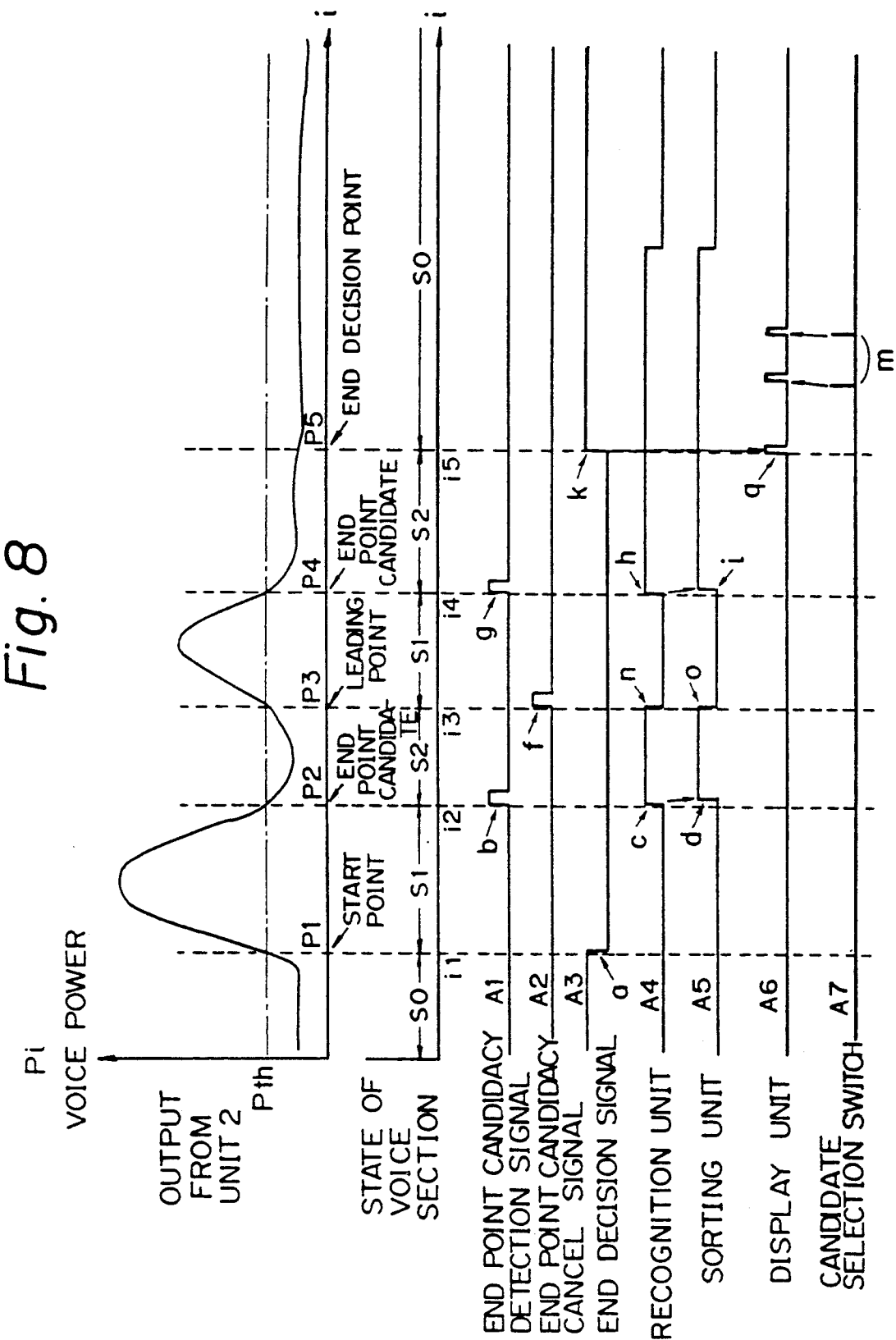
FIG. 8 is a signal timing chart for each of the signals according to the present invention.

FIG. 8 is a signal timing chart for each of signals according to the present invention. As shown in FIG. 5, A1 denotes the end point candidacy detection signal, A2 denotes the end point candidacy cancel signal, A3 denotes the end decision signal, A4 denotes the recognition signal, A5 denotes the sorting signal, A6 denotes the display signal, and A7 denotes the candidate selection switch signal.

When the start point of the voice section is detected in the voice section detection unit 3, the end decision signal A3 of the preceding voice is immediately cleared (a).

Next, when the end point candidate P2 is detected in the voice section detection unit 3, the end point candidacy detection signal A1 is generated from the voice section detection unit 3 and sent to the recognition unit 5 (b). Further, the recognition operation is started in the recognition unit 5 (c), and the sorting unit 14 is activated (d). In this example, since the number of words stored in the word dictionary is very large (large vocabulary), the recognition time for the word is very long so that the recognition operation is temporarily stopped when the point P3 is detected (n) in the present invention.

When the end point candidacy detection signal A1 is again generated (g), the recognition operation is again started (h), and the sorting unit 14 is again activated (i).

After a lapse of 0.3 seconds from the detection of the second end point candidate (P4), the end decision signal A3 is generated from the unit 3 (k), and the result of the recognition is automatically displayed on the CRT (q) although the recognition operation is in progress and not completed as explained below. When the result of the recognition is incorrect, a next word candidate is displayed on the CRT by the operator by using the candidate selection switch 12 (m).

As explained above, the recognition operation is cancelled (n) because the number of words to be compared is large, and the sorting operation is also cancelled (o), and thereafter, the recognition operation is again started (h), and the sorting unit 14 is again activated (i).

In the present invention, although the recognition operation is in progress (h), the intermediate result of the recognition is displayed on the CRT (q). When the result of the recognition is incorrect, the next word candidate is displayed on the CRT by using the candidate selection switch 12 (m).

As explained above, in spite of the large vocabulary, a long time is not necessary from the generation of the end decision signal (k) until the display of the result of the recognition (q) because the intermediate result is displayed on the CRT. Accordingly, a longer time is not necessary to display the resultant data of the recognition. Accordingly, the response speed of the recognition becomes considerably faster so that the throughput of the voice recognition system can considerably increase in spite of the large vocabulary.

In the present invention, the words are ordered in accordance with the frequency of use of the word in the word dictionary 6 based on the data from the word frequency dictionary 16 and the word dictionary sorting unit 17. Accordingly, it is possible to easily search for the corresponding word to be recognized since the higher frequency words are searched in the first step (q), and only when the corresponding word is not found in the first step (q), the word is searched in the next step (m).

FIG. 9 is a view for explaining the content of the word frequency dictionary 16 according to the present invention. As shown in the drawing, the frequency is attached to each word label. For example, the word having the highest frequency degree 100 is "Tokyo", and the next one is "Osaka".

FIG. 10 is a view for explaining the output of the word dictionary sorting unit 17 according to the present invention. The word dictionary sorting unit 17 in FIG. 7 receives the frequency data of the word from the word frequency dictionary 16, sorts the word in accordance with the frequency order, and outputs the frequency data to the word dictionary 6.

FIG. 11 is a view for explaining the content of the word dictionary 6 according to the present invention. As shown in the drawing, the words are stored in accordance with the frequency of use of the word. Accordingly, it is possible to easily search for the corresponding word to be recognized since the higher frequency words are searched in the first step (q).

Figure 12:
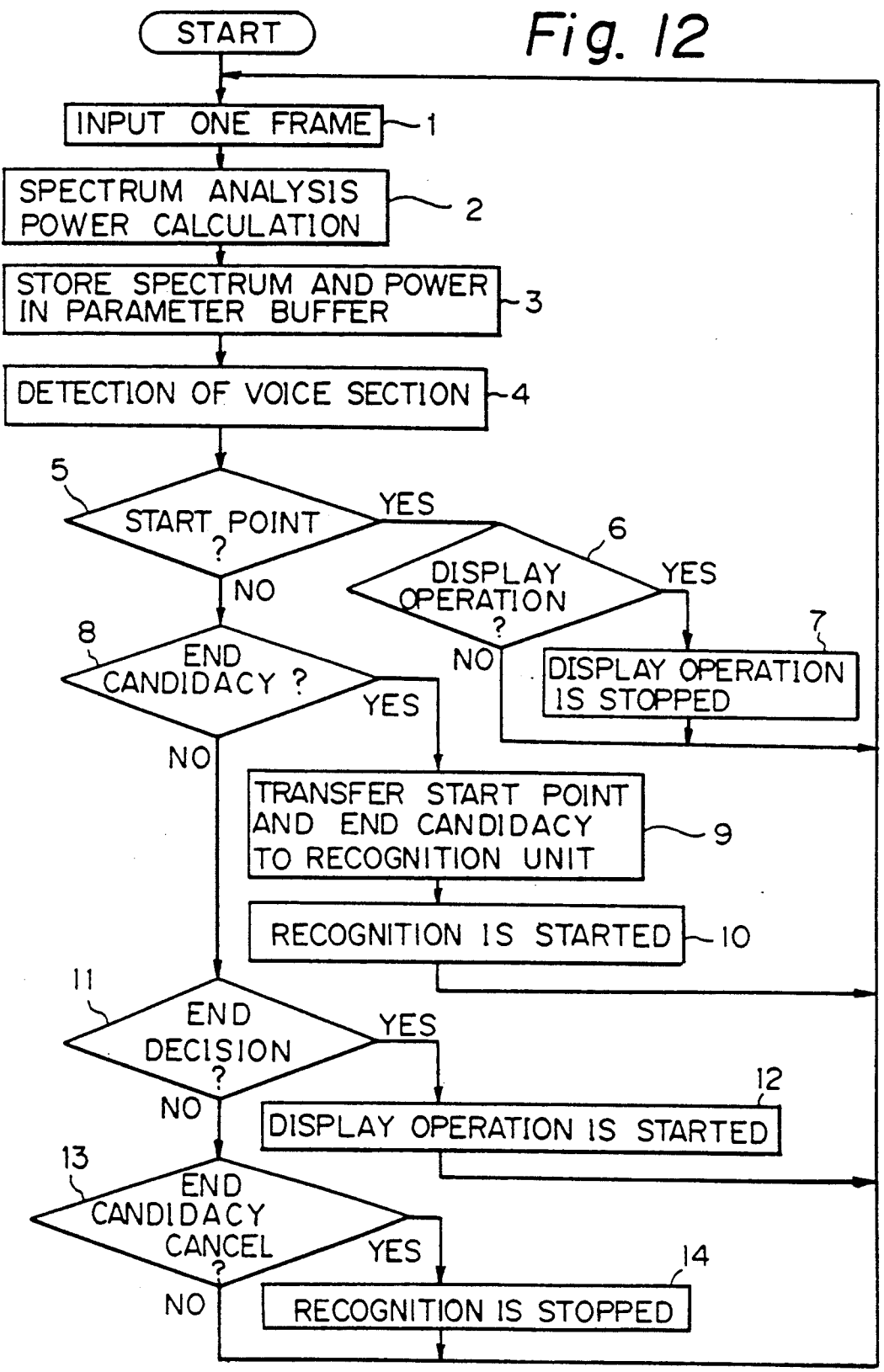
FIG. 12 is a flowchart for explaining a voice input operation according to the present invention.

FIG. 12 is a flowchart for explaining the voice input operation according to the present invention.

The input voice is divided into frame trains having an interval of from several milliseconds to several tens of milliseconds, and one frame is used for analyzing the voice (step 1). Next, the spectrum of the voice is analyzed by using the FFT (Fast Fourier Transformation) and the power (energy) of the voice is calculated for one frame (step 2). These steps are performed in the acoustic processing unit 2. The spectrum and power are stored in the parameter buffer 4 (step 3).

Next, the voice section is detected in the voice section detection unit 3 (step 4). Each detection signal, i.e., the start point, the end point candidacy, the end decision, and the end point candidacy cancel, are output from the voice section detection unit 3 in this step. Next, whether or not the start point is detected is checked in this step (step 15). When "Yes" is determined in step 5, whether or not the display operation is in progress is checked (step 6). When "Yes" is determined in step 6, the display operation is stopped (step 7). When "No" is determined in step 5, whether or not the end point candidacy is detected is checked (step 8). When "Yes" is determined in step 8, the start point and the end point candidacy are transferred to the recognition unit 5 (step 9), and the recognition operation is started (step 10).

When "No" is determined in step 8, whether or not the end is decided is checked (step 11). When "Yes" is determined in step 11, the display operation is started (step 12). When "No" is determined in step 11, whether or not the end point candidacy is cancelled is checked (step 13). When "Yes" is determined in step 13, the recognition operation is stopped (step 14). When "No" is determined in step 13, the processing operation is returned to the step 1.

Figure 13:
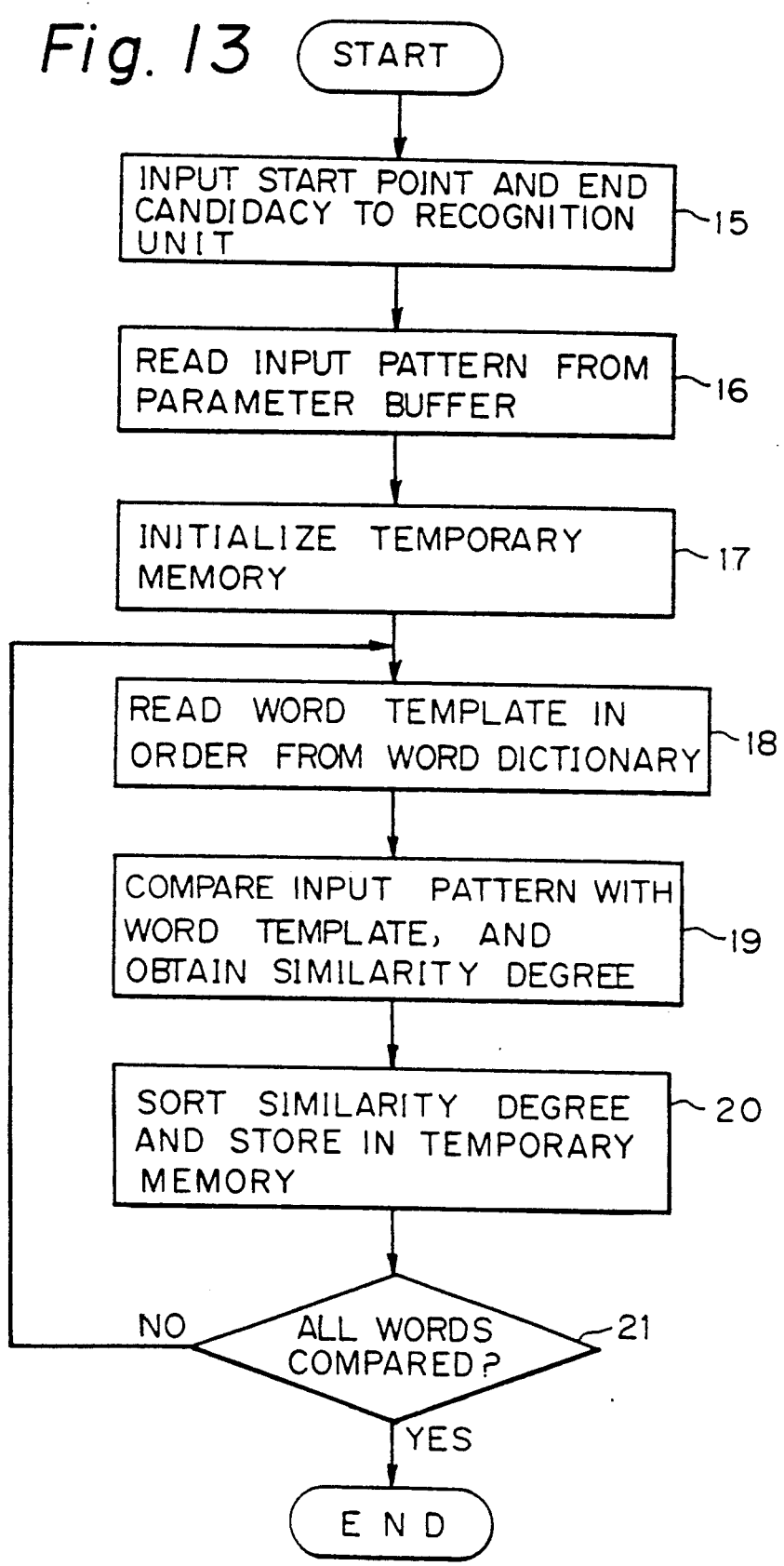
FIG. 13 is a flowchart for explaining a recognition operation according to the present invention.

FIG. 13 is a flowchart for explaining the recognition operation according to the present invention. In the recognition unit 5, the start point and the end point candidate obtained by the step 9 of FIG. 12 are input to the recognition unit (step 15). Next, an input pattern is read from the parameter buffer 5. The input pattern corresponds to the voice sound between the start point and the end point candidate (step 16). Next, the temporary memory 15 is initialized for sorting words according to the degree of similarity between the input pattern and the word template stored in the word dictionary (step 17).

Next, the recognition unit reads the word template in order from the word dictionary 6 (step 18). In the present invention, as explained above, the word templates are ordered in accordance with the higher frequency in the word dictionary 6. Next, the input pattern is compared with the word template (step 19). The words are sorted by sorting unit 14 according to the degree of similarity and stored in the temporary memory (step 20). Finally, whether or not all word templates are compared is checked (step 21).

Figure 14:
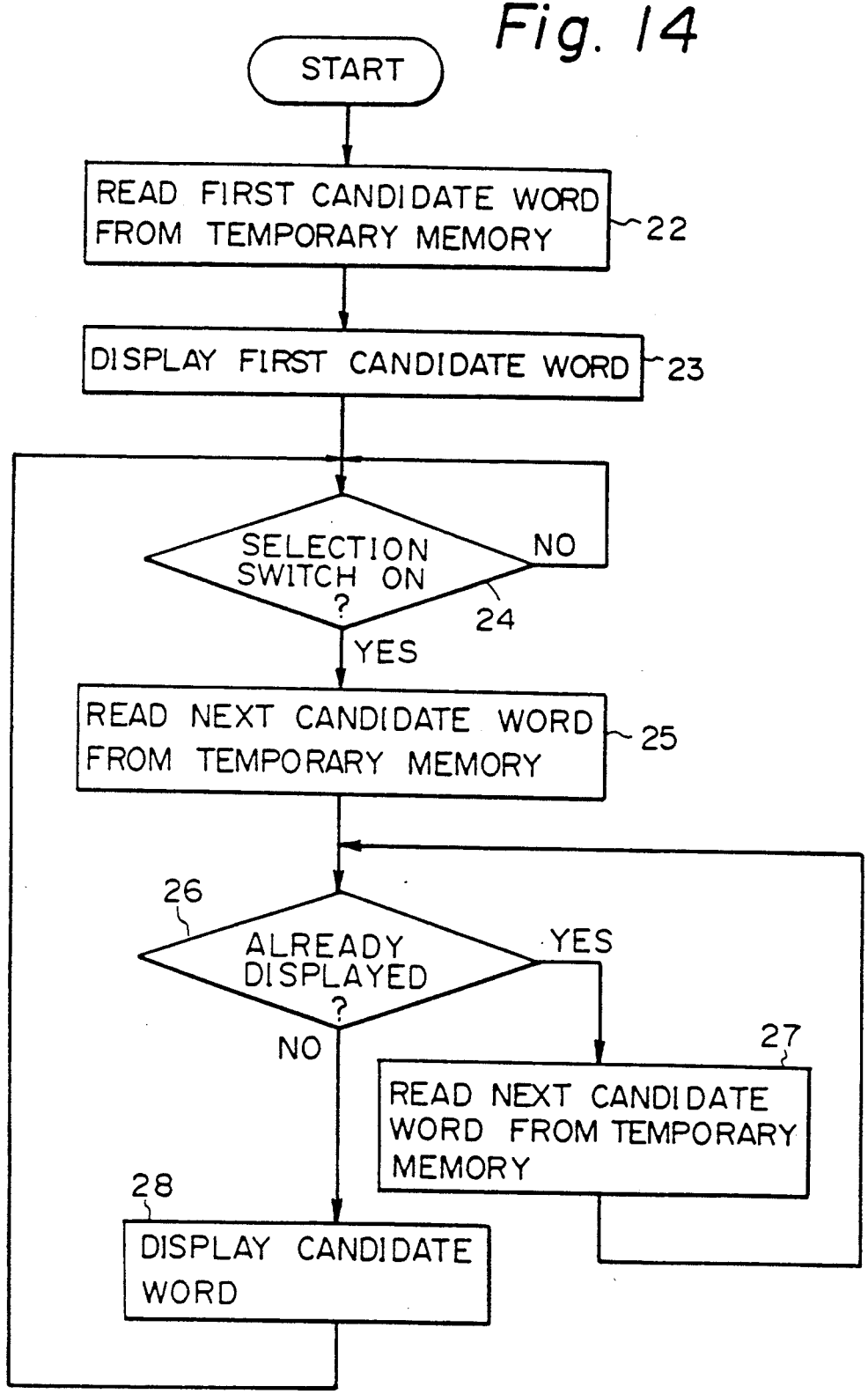
FIG. 14 is a flowchart for explaining a display operation according to the present invention.

FIG. 14 is a flowchart for explaining the display operation according to the present invention. The first word candidate (most similar word to the input voice after recognition) is read from the temporary memory 15 (step 22) and this word is automatically displayed on the CRT (step 23). Next, whether or not the candidate selection switch 12 is turned on is checked (step 24). When "No" is determined in step 24, the switch is turned on. When "Yes" is determined in step 24, a next candidate word (i.e., next similar word) is read from the temporary memory 15 (step 25). Next, whether or not the word in the step 25 is already displayed is checked (step 26). When "Yes" is determined in step 26, the next candidate word is read from the temporary memory (step 27). When "No is determined in step 26, that candidate word is displayed on the CRT (step 28).

I claim:

1. A voice recognition system, comprising:
   a microphone for converting a voice to an electrical voice signal having a voice sound portion and a non-voice portion;
   acoustic processing means for detecting a power and spectrum of the electrical voice signal in accordance with a predetermined sampling time interval, and outputting power time-series data and spectrum time-series data at the predetermined sampling time interval to produce feature time-series data;
   voice section detection means for receiving the power time series data from the acoustic processing means, detecting a start point and an end point of the voice sound portion, and outputting an end decision signal when an end of the voice sound portion is determined;
   a word dictionary for storing, corresponding to words, word labels, word numbers corresponding to the word labels, and word templates comprising the feature time-series data corresponding to the word labels, the word labels being ordered in accordance with a frequency of use of the words;
   verification means for receiving the feature time-series data of the voice to be verified, verifying the feature time-series data with the word template stored in the word dictionary, and calculating a degree of similarity between the voice and the word template;
   sorting means for sorting the words in accordance with the degree of similarity, the data being sorted in order of the higher degree of similarity;
   selection means for selecting one or more words having a higher degree of similarity from the words sorted in the sorting means;
   display means for displaying the words;
   a word frequency dictionary for storing the word labels, the word numbers corresponding to each word label, the word templates comprising the feature time-series data corresponding to each word label, and frequency data attached to each word label; and
   word dictionary sorting means, provided between the word dictionary and the word frequency dictionary, for sorting the word labels of the word frequency dictionary in order of higher degree of frequency to obtain sorted words, and outputting the sorted words to the word dictionary.

2. A voice recognition system as claimed in claim 1, wherein said selection means outputs the words having a higher degree of similarity to the display means when the decision signal is generated from the voice section detection means even if the verification operation is in progress in the verification means.

3. A voice recognition system as claimed in claim 2, further comprising a candidate selection switch operated by an operator when a first word does not correspond to the input voice so that said selection means selects a second word having next higher degree of similarity to be displayed by the display means.

4. A voice recognition system as claimed in claim 1, further comprising a candidate selection switch operated by an operator when a first word does not correspond to the input voice so that said selection means selects a second word having a next higher degree of similarity to be displayed by the display means.

5. A voice recognition system as claimed in claim 1, wherein the degree of similarity is equal to a distance between the voice and the word template, with a smaller distance corresponding to the higher degree of similarity.

6. A voice recognition system as claimed in claim 1, wherein the degree of similarity determines the probability of a hit in the verification operation, with a higher probability corresponding to a higher degree of similarity.

7. A word recognition system comprising:
   a word dictionary storing words;
   a word frequency dictionary storing a frequency of use of each word in the word dictionary;
   voice detection means for detecting a voice word in an input signal, comparing the voice word to the words in said word dictionary, and calculating a degree of similarity between the voice word and each word in the word dictionary;

word similarity sorting means for sorting the words from said word dictionary in order of the degree of similarity until the voice word has been detected by said voice detection means;

word frequency sorting means for sorting the words in the word dictionary on the basis of each word frequency stored in the word frequency dictionary, said word similarity sorting means obtaining words to be sorted in order of the frequency of use; and selection means for displaying the words for selection in an order that has been obtained by said word similarity sorting mean when the voice word has been detected.

8. A word frequency selection system in a voice recognition system in which a voice word is detected in an input signal and words from a word dictionary are sorted in order of a degree of similarity to the voice word and displayed in the order for selection, said word frequency selection system comprising:

a word frequency dictionary storing a frequency of use of each word in the word dictionary; and word frequency sorting means for sorting the words to be sorted by similarity in the word dictionary on the basis of each word frequency stored in the word frequency dictionary.

9. A voice recognition system comprising:

a microphone converting an input signal to an electrical signal having a voice portion and a non-voice portion;

an acoustic processing unit, operatively connected to said microphone, and converting the electrical signal to power time-series data and spectrum time-series data;

a voice section detection unit, operatively connected to said acoustic processing unit, and detecting the voice portion and non-voice portion of the electrical signal;

a parameter buffer, operatively connected to said acoustic processing unit, temporarily storing the spectrum time series data;

a word dictionary storing words and corresponding time-series data;

a verification unit, operatively connected to said voice section detection unit, said parameter buffer and said word dictionary, and calculating a degree of similarity between the spectrum time series data corresponding to the voice portion and spectrum time series data corresponding to one of the words in the word dictionary;

a sorting unit operatively connected to said voice section detection unit and said verification unit, and sorting words in accordance with the degree of similarity;

a temporary memory operatively connected to said sorting unit and storing sorted data from the sorting unit;

a selection unit, operatively connected to said temporary memory, said voice section detection unit and said word dictionary, and receiving one of the words corresponding to the data stored in the temporary memory and outputting the word upon detection by the voice section detection unit of completion of the voice portion of the electrical signal;

a candidate selection switch, operatively connected to said selection unit and receiving a request for the selection unit to select another word;

a display unit operatively connected to said selection unit and displaying the word selected by the selection unit when said candidate selection switch is pressed;

a word frequency dictionary storing a frequency of use of the words in said word dictionary; and a word dictionary sorting unit, operatively connected between said word dictionary and said word frequency dictionary, and sorting the words in said word dictionary based on the frequency of use corresponding to those words as stored in said word frequency dictionary.

10. A method of recognizing a word from an input speech signal, comprising the steps of:

a) storing words in a word dictionary;

b) storing a frequency of use of each of the words;

c) sorting the words in the word dictionary based on the frequency of use of each word;

d) detecting a voice word in an input signal and calculating a degree of similarity between the voice word and each of the words in the word dictionary; and e) sorting the words in order of the degree of similarity until a voice word has been detected.

* * * * *

UNITED STATES PATENT AND TRADEMARK OFFICE
CERTIFICATE OF CORRECTION

PATENT NO. : 5,257,314
DATED : October 26, 1993
INVENTOR(S) : Shinta KIMURA

It is certified that error appears in the above-indentified patent and that said Letters Patent is hereby corrected as shown below:

On the title page, item [56] References Cited, under U.S. Patent Documents, change "4,672,608" to --4,672,668--.

Signed and Sealed this

Twenty-first Day of June, 1994

Attest:

BRUCE LEHMAN

Attesting Officer     Commissioner of Patents and Trademarks